(12) United States Patent
Kasahara

(10) Patent No.: US 11,001,266 B2
(45) Date of Patent: May 11, 2021

(54) HYBRID VEHICLE DRIVE SYSTEM

(71) Applicant: Honda Motor Co., Ltd., Tokyo (JP)

(72) Inventor: Takahiro Kasahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 288 days.

(21) Appl. No.: 16/372,359

(22) Filed: Apr. 1, 2019

(65) Prior Publication Data

US 2019/0308628 A1    Oct. 10, 2019

(30) Foreign Application Priority Data

Apr. 5, 2018   (JP) .............................. JP2018-073074

(51) Int. Cl.
| | |
|---|---|
| *B60W 30/19* | (2012.01) |
| *B60K 6/38* | (2007.10) |
| *F16D 7/02* | (2006.01) |
| *B60K 6/365* | (2007.10) |
| *B60K 6/442* | (2007.10) |
| *B60W 10/08* | (2006.01) |
| *B60W 10/115* | (2012.01) |
| *B60W 20/00* | (2016.01) |
| *F16H 59/46* | (2006.01) |
| *F16H 59/38* | (2006.01) |

(52) U.S. Cl.
CPC ............. *B60W 30/19* (2013.01); *B60K 6/365* (2013.01); *B60K 6/38* (2013.01); *B60K 6/442* (2013.01); *B60W 10/08* (2013.01); *B60W 10/115* (2013.01); *B60W 20/00* (2013.01); *F16D 7/02* (2013.01); *B60W 2710/083* (2013.01); *B60Y 2200/92* (2013.01); *F16H 59/38* (2013.01); *F16H 2059/465* (2013.01)

(58) Field of Classification Search
CPC .... B60W 30/19; B60W 10/115; B60W 20/00; B60W 10/08; B60W 2510/0241; B60K 6/38; B60K 6/365; B60K 6/442; B60K 6/383; B60K 6/445; B60K 6/547; F16D 7/02; B60Y 2200/92; Y02T 10/62; F16H 61/0437; F16H 2059/465; F16H 59/38
See application file for complete search history.

(56) References Cited

U.S. PATENT DOCUMENTS

2016/0368361 A1* 12/2016 Endo ..................... B60W 20/40

FOREIGN PATENT DOCUMENTS

JP          5391959 B2      1/2014

* cited by examiner

*Primary Examiner* — Anne Marie Antonucci
(74) *Attorney, Agent, or Firm* — Duft & Bornsen, PC

(57) ABSTRACT

A hybrid vehicle drive system including an internal combustion engine, a motor-generator, a speed shift mechanism including a first and second frictional engagement mechanisms, a torque limiter interposed the motor generator and the speed shift mechanism in a power transmission path transmitting from the internal combustion engine to an axle, and a controller controlling the speed shift mechanism so as to disengage the first frictional engagement mechanism and engage the second frictional engagement mechanism. The controller is configured to perform controlling the speed shift mechanism so as to increase an engaging force of the second frictional engagement mechanism during switching from high speed stage to low speed stage when an occurrence of slipping is detected than when the occurrence of slipping is not detected.

8 Claims, 11 Drawing Sheets

|  |  | BR | CL | OWY | ENG |
|---|---|---|---|---|---|
| EV MODE | | × | × | × | × |
| W MOTOR MODE | | × | ○ | ○ | × |
| SERIES MODE | | ○ | ○ | × | ○ |
| HV MODE | LOW | × | ○ | ○ | ○ |
| | HIGH | ○ | × | ○ | ○ |

EV MODE

W MOTOR MODE

SERIES MODE

HV LOW MODE

HV HIGH MODE

HYBRID VEHICLE DRIVE SYSTEM

CROSS-REFERENCE TO RELATED APPLICATION

This application is based upon and claims the benefit of priority from Japanese Patent Application No. 2018-073074 filed on Apr. 5, 2018, the content of which is incorporated herein by reference.

BACKGROUND OF THE INVENTION

Field of the Invention

This invention relates to a drive system of a hybrid vehicle.

Description of the Related Art

Conventionally, there is a known apparatus that includes an engine and a motor-generator, serving as driving power sources, and a speed shift mechanism installed in a path for transmitting engine motive power to axles, and that are adapted to propel a vehicle with motive power output through the speed shift mechanism and motive power of the motor-generator. Such an apparatus is described in, for example, Japanese Examined Patent Publication No. 5391959 (JP5391959B). The speed shift mechanism of the apparatus described in JP5391959B includes a pair of frictional engagement mechanisms, and the speed shift mechanism can be switched to high speed stage or low speed stage by engaging one frictional engagement mechanism and disengaging the other frictional engagement mechanism or by disengaging the one frictional engagement mechanism and engaging the other frictional engagement mechanism.

A concern regarding this kind of apparatus is that when, for example, a torque limiter is installed between the shift mechanism and the motor-generator, proper switching of the speed shift mechanism is apt to be difficult when slipping occurs in the torque limiter.

SUMMARY OF THE INVENTION

An aspect of the present invention is a drive system of a hybrid vehicle including: an internal combustion engine; a power transmission path formed from the internal combustion engine to an axle; a speed shift mechanism disposed in the power transmission path and including a first frictional engagement mechanism having mutually engageable and disengageable members and a second frictional engagement mechanism having mutually engageable and disengageable members so as to switch a speed stage to a low speed stage or a high speed stage in accordance with a speed shift instruction; a motor-generator disposed in the power transmission path between the speed shift mechanism and the axle; a torque limiter disposed in the power transmission path between the speed shift mechanism and the motor-generator to limit a transmitted torque by slipping; and an electronic control unit including a microprocessor and a memory. The microprocessor is configured to perform controlling the speed shift mechanism so as to disengage the first frictional engagement mechanism in a engaged state and engage the second frictional engagement mechanism in a disengaged state during switching from the high speed stage to the low speed stage, detecting an occurrence of slipping of the torque limiter, and the controlling including controlling the speed shift mechanism so as to increase an engaging force of the second frictional engagement mechanism during switching from the high speed stage to the low speed stage when the occurrence of slipping is detected than when the occurrence of slipping is not detected.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
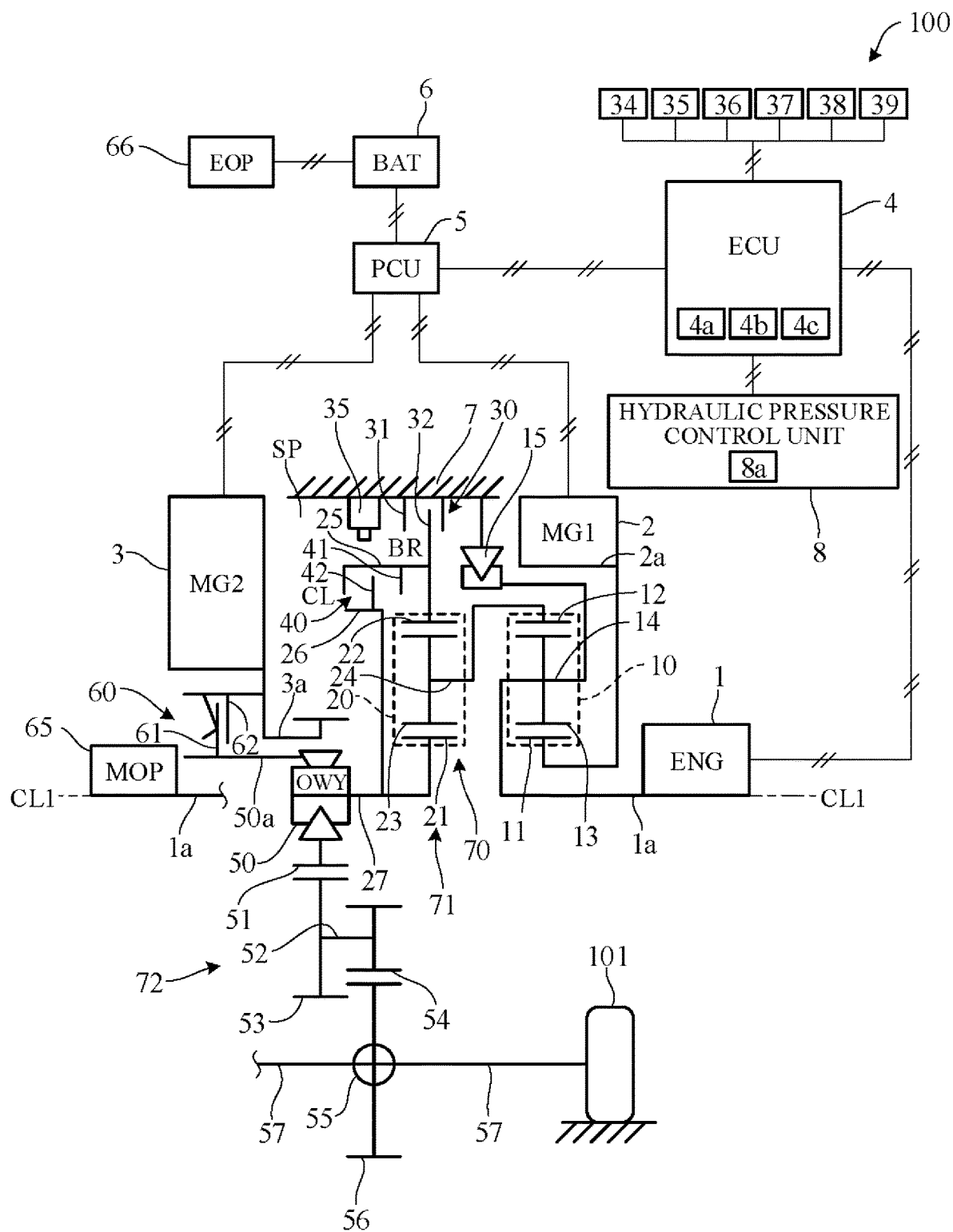
FIG. 1 is a diagram showing schematically a configuration overview of a drive system of a hybrid vehicle according to an embodiment of the invention.

Hereinafter, an embodiment of the present invention is explained with reference to FIGS. 1 to 13. A drive system according to an embodiment of the present invention is applied to a hybrid vehicle including an engine and a motor-generator as a drive power source. FIG. 1 is a diagram showing schematically a configuration overview of a drive system 100 according to the present embodiment.

As shown in FIG. 1, the drive system (drive unit) 100 includes an engine (ENG) 1, first and second motor-generators (MG1 and MG2) 2 and 3, a first planetary gear mechanism 10 for dividing motive power, and a second planetary gear mechanism 20 for changing speed ratio. The drive system 100 is mounted at front of a vehicle, and motive power of the drive system 100 is transmitted to front wheels 101. The vehicle is thus structured as a front-wheel-drive (i.e., FF layout) vehicle.

The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Throttle valve opening, quantity of fuel injected from the injector (injection time and injection time period) and ignition time are, inter alia, controlled by a controller (ECU) 4. An output shaft 1a of the engine 1 extends centered on axis CL1.

The first and second motor-generators 2 and 3 each has a substantially cylindrical rotor centered on axis CL1 and a substantially cylindrical stator installed around the rotor and can function as a motor and as a generator. Namely, the rotors of the first and second motor-generators 2 and 3 are driven by electric power supplied from a battery 6 through a power control unit (PCU) 5 to coils of the stators. In such case, the first and second motor-generators 2 and 3 function as motors.

On the other hand, when rotating shafts 2a and 3a of rotors of the first and second motor-generators 2 and 3 are driven by external forces, the first and second motor-generators 2 and 3 generate electric power that is applied through the power control unit 5 to charge the battery 6. In such case, the first and second motor-generators 2 and 3 function as generators. During normal vehicle traveling, such as during cruising or acceleration, for example, the first motor-generator 2 functions chiefly as a generator and the second motor-generator 3 functions chiefly as a motor. The power control unit 5 incorporates an inverter controlled by instructions from the controller 4 so as to individually control output torque or regenerative torque of the first motor-generator 2 and the second motor-generator 3.

The first motor-generator 2 and the second motor-generator 3 are coaxially installed at spaced locations. The first motor-generator 2 and second motor-generator 3 are, for example, housed in a common case 7, and a space SP between them is enclosed by the case 7. Optionally, the first motor-generator 2 and second motor-generator 3 can be housed in separate cases.

The first planetary gear mechanism 10 and second planetary gear mechanism 20 are installed in the space SP between the first motor-generator 2 and second motor-generator 3. Specifically, the first planetary gear mechanism 10 is situated on the side of the first motor-generator 2 and the second planetary gear mechanism 20 on the side of the second motor-generator 3.

The first planetary gear mechanism 10 includes a first sun gear 11 and a first ring gear 12 installed around the first sun gear 11, both of which rotate around axis CL1, multiple circumferentially spaced first pinions (planetary gears) 13 installed between the first sun gear 11 and first ring gear 12 to mesh with these gears 11 and 12, and a first carrier 14 that supports the first planetary gears 13 to be individually rotatable around their own axes and collectively revolvable around axis CL1.

Similarly to the first planetary gear mechanism 10, the second planetary gear mechanism 20 includes a second sun gear 21 and a second ring gear 22 installed around the second sun gear 21, both of which rotate around axis CL1, multiple circumferentially spaced second pinions (planetary gears) 23 installed between the second sun gear 21 and second ring gear 22 to mesh with these gears 21 and 22, and a second carrier 24 that supports the second planetary gears 23 to be individually rotatable around their own axes and collectively revolvable around axis CL1.

The output shaft 1a of the engine 1 is connected to the first carrier 14, and power of the engine 1 is input to the first planetary gear mechanism 10 through the first carrier 14. On the other hand, when the engine 1 is started, power from the first motor-generator 2 is input to the engine 1 through the first planetary gear mechanism 10. The first carrier 14 is connected to a one-way clutch 15 provided on an inner peripheral surface of a surrounding wall of the case 7. The one-way clutch 15 allows forward rotation of the first carrier 14, i.e., rotation in same direction as that of the engine 1, and prohibits reverse rotation. Provision of the one-way clutch 15 prevents the engine 1 from being reversely rotated by reverse torque acting through the first carrier 14.

The first sun gear 11 is connected to the rotating shaft 2a of the rotor of the first motor-generator 2, and the first sun gear 11 and first motor-generator 2 (rotor) rotate integrally. The first ring gear 12 is connected to the second carrier 24, and the first ring gear 12 and second carrier 24 rotate integrally. Owing to this configuration, the first planetary gear mechanism 10 can output power received from the first carrier 14 through the first sun gear 11 to the first motor-generator 2 and output power through the first ring gear 12 to the second carrier 24 on an axle (drive shaft) 57 side. In other words, it can dividedly output power from the engine 1 to the first motor-generator 2 and the second planetary gear mechanism 20.

An axis CL1-centered substantially cylindrical outer drum 25 is provided radially outside the second ring gear 22. The second ring gear 22 is connected to and rotates integrally with the outer drum 25. A brake mechanism 30 is provided radially outward of the outer drum 25. The brake mechanism 30 is, for example, structured as a multi-plate wet brake including multiple radially extending plates (friction members) 31 arranged in axial direction and multiple radially extending disks (friction members) 32 arranged in axial direction (multiple illustration is omitted in the drawing). The plates 31 and disks 32 are alternately arranged in axial direction. In other words, the brake mechanism 30 includes the plates 31 and disks 32 as frictional engagement members.

The multiple plates 31 are circumferentially non-rotatably and axially movably engaged at their radial outer ends with the inner peripheral surface of the surrounding wall of the case 7. The multiple disks 32 rotate integrally with the outer drum 25 owing to their radially inner ends being engaged with outer peripheral surface of the outer drum 25 to be circumferentially non-rotatable and axially movable relative to the outer drum 25. A non-contact rotational speed sensor 35 for detecting rotational speed of the outer drum 25 (second ring gear 22) is provided on inner peripheral surface of the case 7 to face outer peripheral surface of the outer drum 25 axially sideward of the brake mechanism 30.

The brake mechanism 30 includes a spring (not shown) for applying biasing force acting to separate the plates 31 and disks 32 and thus release the disks 32 from the plates 31, and a piston (not shown) for applying pushing force acting against the biasing force of the spring to engage the plates 31 and disks 32. The piston is driven by hydraulic pressure supplied through a hydraulic pressure control unit 8. In a state with no hydraulic pressure acting on the piston, the plates 31 and disks 32 separate, thereby releasing (turning OFF) the brake mechanism 30 and allowing rotation of the second ring gear 22. On the other hand, when hydraulic pressure acts on the piston, the plates 31 and disks 32 engage, thereby operating (turning ON) the brake mechanism 30. In this state, rotation of the second ring gear 22 is prevented.

An axis CL1-centered substantially cylindrical inner drum 26 is provided radially inward of and facing the outer drum 25. The second sun gear 21 is connected to an output shaft 27 of a second planetary gear mechanism 20 that extends along axis CL1 and is connected to the inner drum 26, whereby the second sun gear 21, output shaft 27 and inner drum 26 rotate integrally. A clutch mechanism 40 is provided between the outer drum 25 and the inner drum 26.

The clutch mechanism 40 is, for example, structured as a multi-plate wet clutch including multiple radially extending plates (friction members) 41 arranged in axial direction and multiple radially extending disks (friction members) 42 arranged in axial direction (multiple illustration is omitted in the drawing). The plates 41 and disks 42 are alternately arranged in axial direction. In other words, the clutch mechanism 40 includes the plates 41 and disks 42 as frictional engagement members.

The multiple plates 41 rotate integrally with the outer drum 25 owing to their radial outer ends being engaged with the inner peripheral surface of the outer drum 25 to be circumferentially non-rotatable and axially movable relative to the outer drum 25. The multiple disks 42 rotate integrally with the inner drum 26 owing to their radially inner ends being engaged with outer peripheral surface of the inner drum 26 to be circumferentially non-rotatable and axially movable relative to the inner drum 26.

The clutch mechanism 40 includes a spring (not shown) for applying biasing force acting to separate the plates 41 and disks 42 and thus release the disks 42 from the plates 41, and a piston (not shown) for applying pushing force acting against the biasing force of the spring to engage the plates 41 and disks 42. The piston is driven by hydraulic pressure supplied through the hydraulic pressure control unit 8.

In a state with no hydraulic pressure acting on the piston, the plates 41 and disks 42 separate, thereby releasing (turning OFF) the clutch mechanism 40 and allowing relative rotation of the second sun gear 21 with respect to the second ring gear 22. When rotation of the second ring gear 22 is prevented by the brake mechanism 30 being ON at this time, rotation of the output shaft 27 with respect to the second carrier 24 is accelerated. This state corresponds to speed ratio stage being shifted to high.

On the other hand, when hydraulic pressure acts on the piston, the plates 41 and disks 42 engage, thereby operating (turning ON) the clutch mechanism 40 and integrally joining the second sun gear 21 and second ring gear 22. When rotation of the second ring gear 22 is allowed by the brake mechanism 30 being OFF at this time, the output shaft 27 becomes integral with the second carrier 24 and rotates at the same speed as the second carrier 24. This state corresponds to speed ratio stage being shifted to low.

Engaging force between the plates 31 and disks 32 of the brake mechanism 30 and engaging force between plates 41 and disks 42 of the clutch mechanism 40, i.e., clutch torques (torque capacity) transmitted at the frictional engagement members are adjusted by controlling magnitude of pressure of hydraulic oil supplied through the hydraulic pressure control unit 8. Therefore, the brake mechanism 30 and the clutch mechanism 40 are put into partially clutched state (half-clutch state).

The second planetary gear mechanism 20, brake mechanism 30 and clutch mechanism 40 configure a speed shift mechanism 70 that shifts rotation of the second carrier 24 between two speed stages (high and low) and outputs the shifted rotation from the output shaft 27. Torque transmission path from the first planetary gear mechanism 10 to the output shaft 27 of upstream of the one-way clutch 50 through the speed shift mechanism 70 configures a first power transmission path 71.

The output shaft 27 is connected through a one-way clutch 50 to an output gear 51 centered on axis CL1. The one-way clutch 50 allows forward rotation of the output gear 51 with respect to the output shaft 27, i.e., relative rotation corresponding to vehicle forward direction, and prohibits rotation corresponding to vehicle reverse direction. In other words, when rotational speed of the output shaft 27 corresponding to vehicle forward direction is faster than rotational speed of the output gear 51, the one-way clutch 50 locks, whereby the output shaft 27 and output gear 51 rotate integrally. On the other hand, when rotational speed of the output gear 51 corresponding to vehicle forward direction is faster than rotational speed of the output shaft 27, the one-way clutch 50 disengages (unlocks), whereby the output gear 51 freely rotates with respect to the output shaft 27 without torque pulled back.

A rotating shaft 3a of the rotor of the second motor-generator 3 is connected to the output gear 51, so that the output gear 51 and the second motor-generator 3 (rotating shaft 3a) rotate integrally. Since the one-way clutch 50 is interposed between the output shaft 27 and the rotating shaft 3a, forward relative rotation of the rotating shaft 3a with respect to the output shaft 27 is allowed. In other words, when rotational speed of the second motor-generator 3 is faster than rotational speed of the output shaft 27, the second motor-generator 3 efficiently rotates without torque of the output shaft 27 (second planetary gear mechanism 20) pulled back. The one-way clutch 50 is installed radially inward of the rotating shaft 3a. Since axial length of the drive system 100 can therefore be minimized, a smaller drive system 100 can be realized.

The present embodiment further includes a torque limiter 60 interposed between the one-way clutch 50 and the second motor-generator 3. The torque limiter 60 allows transmission of torque not greater than a predetermined value and limits transmission of torque greater than the predetermined value. A frictional engagement type torque limiter can be adopted as the torque limiter 60. More specifically, the torque limiter 60 includes an input side engagement member 61 connected to a rotating shaft 50a on output side of the one-way clutch 50 and an output side engagement member 62 connected to a rotating shaft 3a of the second motor-generator 3. When torque transmitted between the engagement members 61 and 62 exceeds the predetermined value, slipping arises between the engagement members 61 and 62, whereby transmitted torque can be held to not greater than the predetermined value.

A mechanical oil pump (MOP) 65 is installed radially inward of the rotor of the second motor-generator 3. The mechanical oil pump 65 is connected to the output shaft 1a of the engine 1 and driven by the engine 1. Oil supply necessary when the engine 1 is stopped is covered by driving an electric pump (EOP) 66 with power from the battery 6.

A large-diameter gear 53 rotatable around a counter shaft 52 lying parallel to axis CL1 meshes with the output gear 51, and torque is transmitted to the counter shaft 52 through the large-diameter gear 53. Torque transmitted to the counter shaft 52 is transmitted through a small-diameter gear 54 to a ring gear 56 of a differential unit 55 and further transmitted through the differential unit 55 to the left and right axles (drive shaft) 57. Since this drives the front wheels 101, the vehicle travels. The torque limiter 60, rotating shaft 3a, output gear 51, large-diameter gear 53, small-diameter gear 54 and differential unit 55, inter alia, configure a second power transmission path 72 as a torque transmission path from the one-way clutch 50 to the axles 57. The first and second power transmission paths 71 and 72 are connected with each other in series.

The hydraulic pressure control unit 8 includes electromagnetic valve, proportional electromagnetic valve, and other control valves (control valve 8a) actuated in accordance with electric signals. The control valve 8a operates to control hydraulic pressure flow to the brake mechanism 30, clutch mechanism 40 and the like in accordance with instructions from the controller 4. More specifically, the control valve 8a controls hydraulic oil flow to an oil chamber facing piston of the brake mechanism 30 and to an oil chamber facing piston of the clutch mechanism 40. This enables ON-OFF switching of the brake mechanism 30 and clutch mechanism 40. Hydraulic oil flow to the other portion is controlled by other control valve of the hydraulic pressure control unit 8.

The controller (ECU) 4 as an electric control unit incorporates an arithmetic processing unit having a CPU, ROM, RAM and other peripheral circuits, and the CPU includes an engine control ECU 4a, a speed shift mechanism control ECU 4b and a motor-generator control ECU 4c. Alternatively, the multiple ECUs 4a to 4c need not be incorporated in the single controller 4 but can instead be provided as multiple discrete controllers 4 corresponding to the ECUs 4a to 4c.

The controller 4 receives as input signals from, inter alia, a rotational speed sensor 34 for detecting rotational speed of the engine 1, a rotational speed sensor 35 for detecting rotational speed of the outer drum 25 (second ring gear 22), a vehicle speed sensor 36 for detecting vehicle speed, an accelerator opening angle sensor 37 for detecting accelerator opening angle indicative of amount of accelerator pedal depression, a rotational speed sensor 38 for detecting rotational speed of the first motor-generator 2, and a rotational speed sensor 39 for detecting rotational speed of the second motor-generator 3.

Based on these input signals, the controller 4 includes a mode instruction unit that decides drive mode in accordance with a predefined driving force map representing vehicle driving force characteristics defined in terms of factors such as vehicle speed and accelerator opening angle, and that instructs the decided drive mode. Further, in order to enable the vehicle to travel in accordance with drive mode instruction by the mode instruction unit, the controller 4 controls operation of the engine 1, first and second motor-generators 2 and 3, the brake mechanism 30 and the clutch mechanism 40 by outputting control signals to, inter alia, an actuator for regulating throttle valve opening, an injector for injecting fuel, the power control unit 5 and the hydraulic pressure control unit 8 (control valve 8a).

Figures 2, 3:
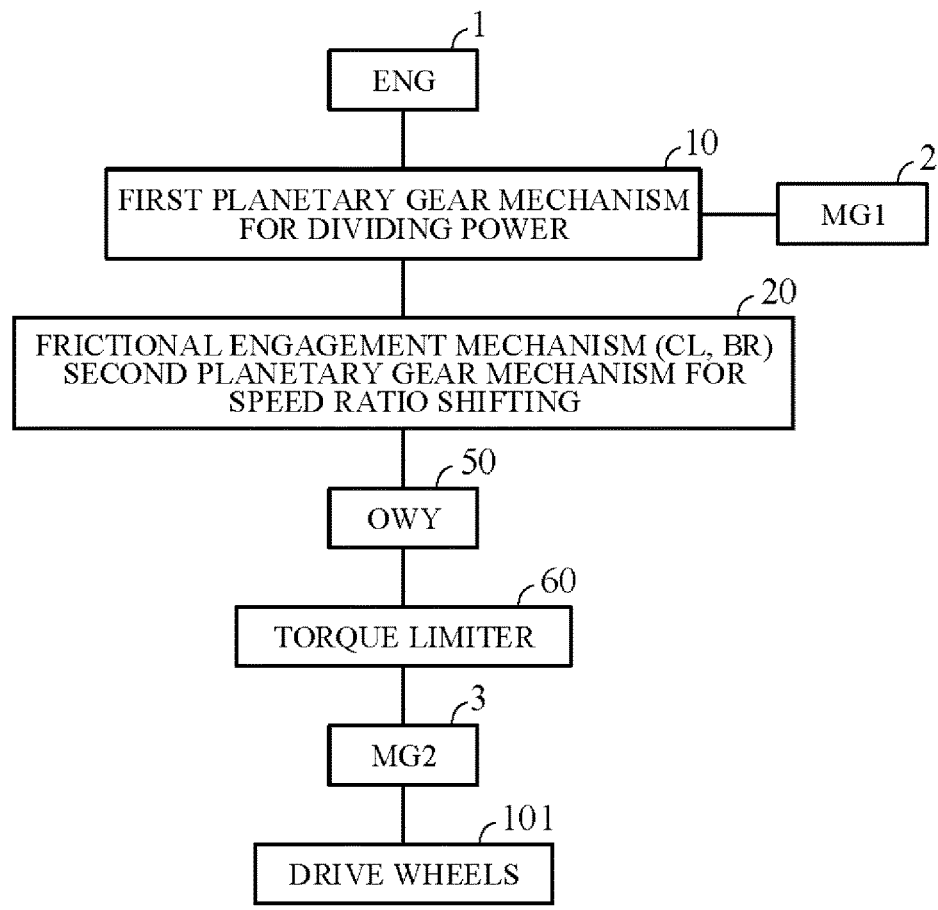
FIG. 2 is a diagram showing an interconnection of main components of the drive system of the hybrid vehicle according to the embodiment of the invention.
FIG. 3 is a diagram an example of drive modes implemented by the drive system of the hybrid vehicle according to the embodiment of the invention.

FIG. 2 is a drawing summarizing interconnection of main components of the drive system 100. As shown in FIG. 2, the first planetary gear mechanism 10 for dividing engine power is connected to the engine 1. The first motor-generator 2 and second planetary gear mechanism 20 for speed ratio shifting are connected to the first planetary gear mechanism 10. The second motor-generator 3 is connected through the one-way clutch 50 and the torque limiter 60 to the second planetary gear mechanism 20, and the front wheels 101 are connected to the second motor-generator 3 as drive wheels.

FIG. 3 is a table showing examples of some drive modes that can be implemented by the drive system 100 according to this embodiment of the present invention, along with operating states of the brake mechanism (BR) 30, clutch mechanism (CL) 40, one-way clutch (OWY) 50 and engine (ENG) 1 corresponding to the different modes.

In FIG. 3, EV mode, W motor mode, series mode and HV mode are shown as typical drive modes. HV mode is subdivided into low mode (HV low mode) and high mode (HV high mode). In the drawing, brake mechanism 30 ON (Engaged), clutch mechanism 40 ON (Engaged), one-way clutch 50 Locked, and engine 1 Operating are indicated by symbol "○", while brake mechanism 30 OFF (Disengaged), clutch mechanism 40 OFF (Disengaged), one-way clutch 50 Unlocked, and engine 1 Stopped are indicated by symbol "x". FIGS. 4 to 8 are skeleton diagrams showing flow of torque transmission in these modes. The torque limiter 60 is not shown in FIGS. 4 to 8 for convenience sake.

In EV mode, the vehicle is driven for traveling solely by motive power of the second motor-generator 3. As shown in FIG. 3, in EV mode, the brake mechanism 30 and clutch mechanism 40 are both OFF, and the engine 1 is stopped, in accordance with instructions from the controller 4.

Figure 4:
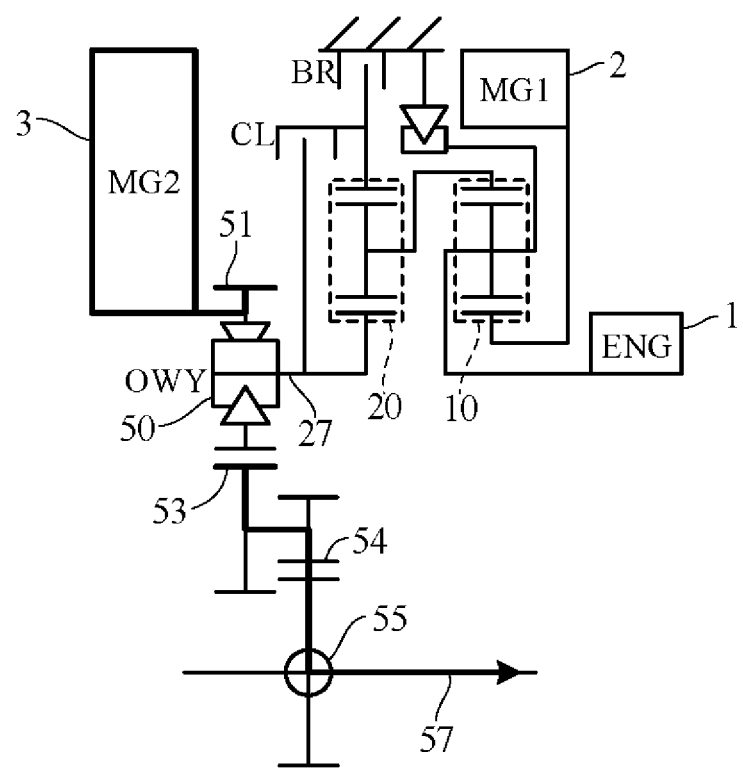
FIG. 4 is a skeleton diagram showing a flow of torque transmission in EV mode in the drive system of FIG. 1.

As show in FIG. 4, in EV mode, torque output from the second motor-generator 3 is transmitted through the output gear 51, large-diameter gear 53, small-diameter gear 54 and differential unit 55 to the axles 57. At this time, the output shaft 27 stays stopped under action of the one-way clutch 50 and efficient vehicle running can be achieved without torque pulled back (rotational resistance) attributable to rotating elements upstream of the second motor-generator 3 (on second planetary gear mechanism side).

In W motor mode, the vehicle is driven for traveling by motive power of the first motor-generator 2 and the second motor-generator 3. As shown in FIG. 3, in W motor mode, the brake mechanism 30 is OFF, the clutch mechanism 40 is ON and the engine 1 is stopped, in accordance with instructions from the controller 4.

Figure 5:
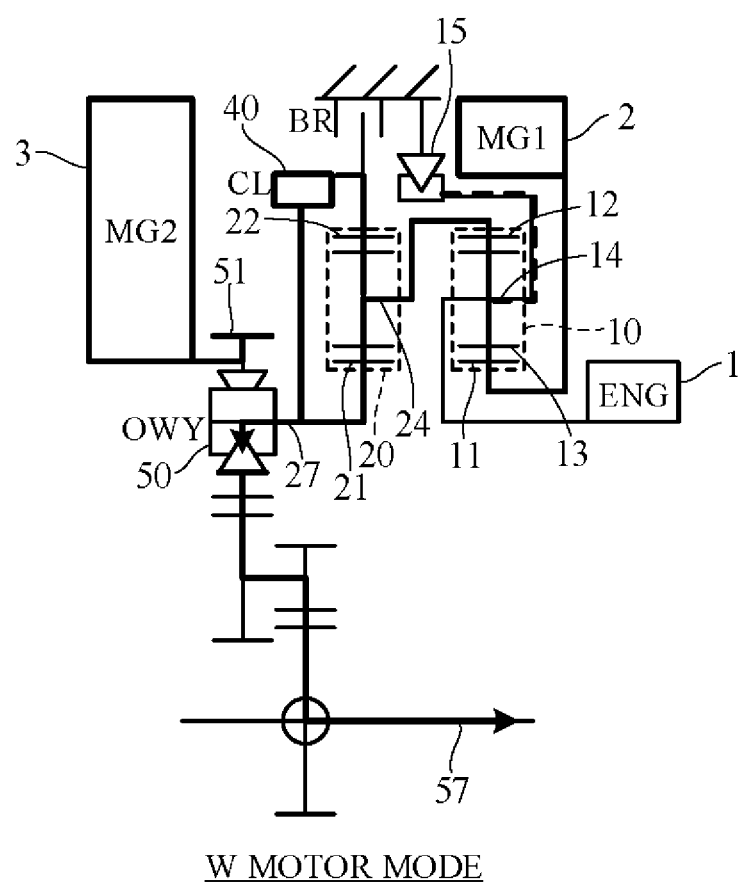
FIG. 5 is a skeleton diagram showing a flow of torque transmission in W motor mode in the drive system of FIG. 1.

As show in FIG. 5, in W motor mode, rotation of the first carrier 14 is prevented by action of the one-way clutch 15, and torque output from the first motor-generator 2 is transmitted through the first sun gear 11, first planetary gears 13, first ring gear 12, second carrier 24 (second carrier 24 rotating integrally with the second sun gear 21 and second ring gear 22) to the output shaft 27. Torque transmitted to the output shaft 27 is transmitted through the locked one-way clutch 50 to the output gear 51, and transmitted to the axles 57 together with torque output from the second motor-generator 3. Since torque from the first motor-generator 2 and second motor-generator 3 is applied to the axles 57 in this manner in W motor mode, travel driving force can be increased to greater than in EV mode. In W motor mode, generating electricity in the first motor-generator 2 is not implemented. Therefore, W motor mode can be implemented when state of charge of the battery 6 (SOC) is greater than or equal to a predetermined value.

In series mode, the vehicle is driven for traveling by motive power of the second motor-generator 3 while the first motor-generator 2 is being driven by motive power from the engine 1 to generate electric power. As shown in FIG. 3, in series mode, the brake mechanism 30 and clutch mechanism 40 are both ON and the engine 1 is operated, in accordance with instructions from the controller 4.

Figure 6:
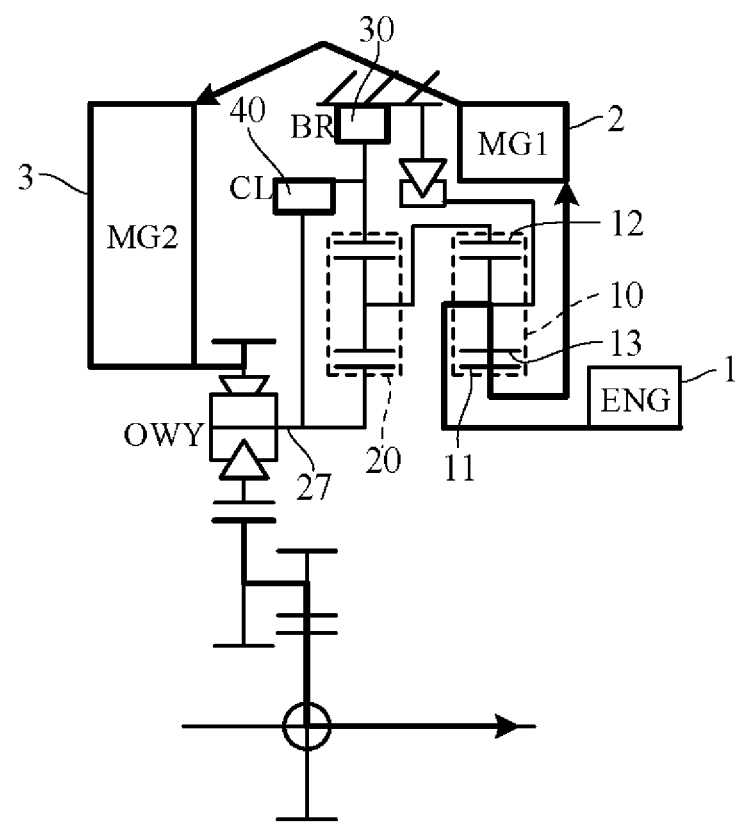
FIG. 6 is a skeleton diagram showing a flow of torque transmission in series mode in the drive system of FIG. 1.

As shown in FIG. 6, in series mode, rotation from the first ring gear 12 to as far as the output shaft 27 is stopped, so that all power output from the engine 1 is input through the planetary gears 13 and first sun gear 11 to the rotor rotating shaft 2a of the first motor-generator 2. The first motor-generator 2 is therefore driven to generate electric power and this generated electric power is used to drive the second motor-generator 3, whereby the vehicle can travel. In other words, an electrical path is structured for supplying electrical energy generated by the first motor-generator 2 to the second motor-generator 3, whereby running of the vehicle is driven by the second motor-generator 3. In series mode, as in EV mode, pull back of torque is prevented by action of the one-way clutch 50.

In HV mode, the vehicle is driven for traveling by motive power produced by the engine 1 and the second motor-generator 3. Within the HV mode, the HV low mode corresponds to a mode of wide-open acceleration from low speed, and the HV high mode corresponds to a mode of normal traveling after EV traveling. As shown in FIG. 3, in HV low mode, the brake mechanism 30 is OFF, the clutch mechanism 40 is ON and the engine 1 is operated, in accordance with instructions from the controller 4. In HV high mode, the brake mechanism 30 is ON, the clutch mechanism 40 is OFF and the engine 1 is operated, in accordance with instructions from the controller 4.

Figure 7:
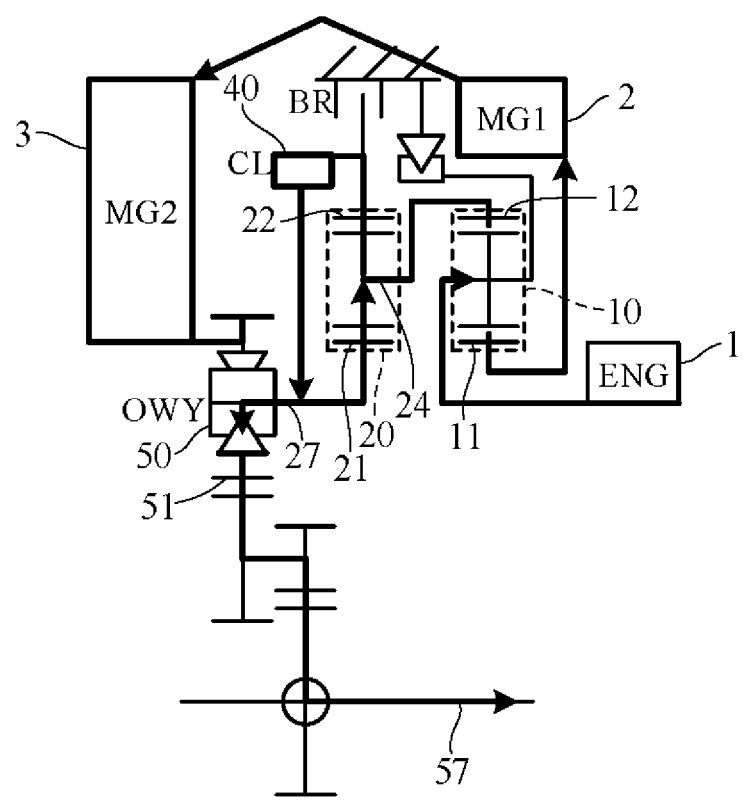
FIG. 7 is a skeleton diagram showing a flow of torque transmission in HV low mode in the drive system of FIG. 1.

As shown in FIG. 7, in HV low mode, some torque output from the engine 1 is transmitted through the first sun gear 11 to the first motor-generator 2. As a result, the battery 6 is charged by power generated by the first motor-generator 2, and, in addition, electrical drive power is supplied from the battery 6 to the second motor-generator 3.

In HV low mode, remainder of torque output from the engine 1 is transmitted through the first ring gear 12 and the second carrier 24 (second carrier 24 rotating integrally with the second sun gear 21 and second ring gear 22) to the output shaft 27. Rotational speed of the output shaft 27 at this time is equal to rotational speed of the second carrier 24. Torque transmitted to the output shaft 27 is transmitted through the locked one-way clutch 50 to the output gear 51, and transmitted to the axles 57 together with torque output from the second motor-generator 3. This enables high-torque vehicle running using torque from the engine 1 and second motor-generator 3, while maintaining sufficient battery residual charge with power generated by the first motor-generator 2.

Figure 8:
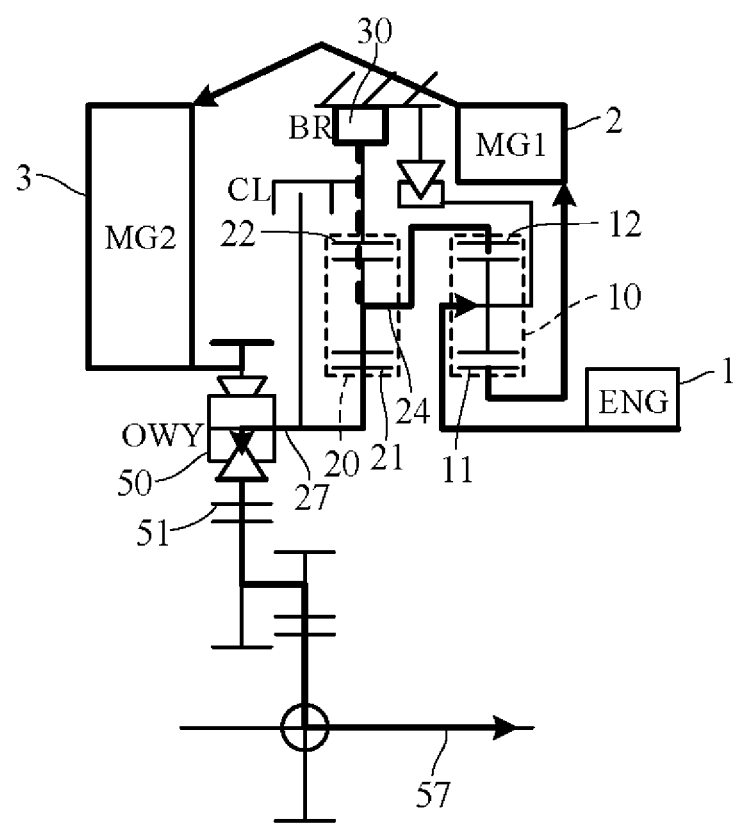
FIG. 8 is a skeleton diagram showing a flow of torque transmission in HV high mode in the drive system of FIG. 1.

As shown in FIG. 8, in HV high mode, similarly to in HV low mode, some torque output from the engine 1, for example, is transmitted through the first sun gear 11 to the first motor-generator 2. Remainder of torque output from the engine 1 is transmitted through the first ring gear 12, second carrier 24 and second sun gear 21 to the output shaft 27. Rotational speed of the output shaft 27 at this time is greater than rotational speed of the second carrier 24.

Torque transmitted to the output shaft 27 is transmitted through the locked one-way clutch 50 to the output gear 51, and transmitted to the axles 57 together with torque output from the second motor-generator 3. Therefore, by utilizing torque from the engine 1 and second motor-generator 3 while maintaining sufficient battery residual charge, vehicle running can be achieved at torque that, while lower than that in HV low mode, is higher than that in EV mode. Since rotation of the output shaft 27 is speeded up by the second planetary gear mechanism 20 in HV high mode, running at lower engine speed than in HV low mode can be realized.

Figure 9:
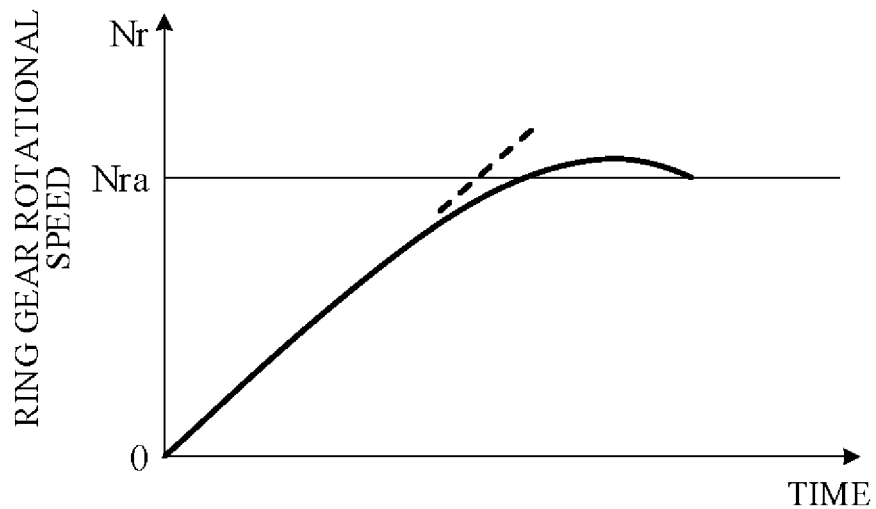
FIG. 9 is a diagram showing change of ring gear rotational speed when drive mode is switched from HV high mode to HV low mode.
Figure 10:
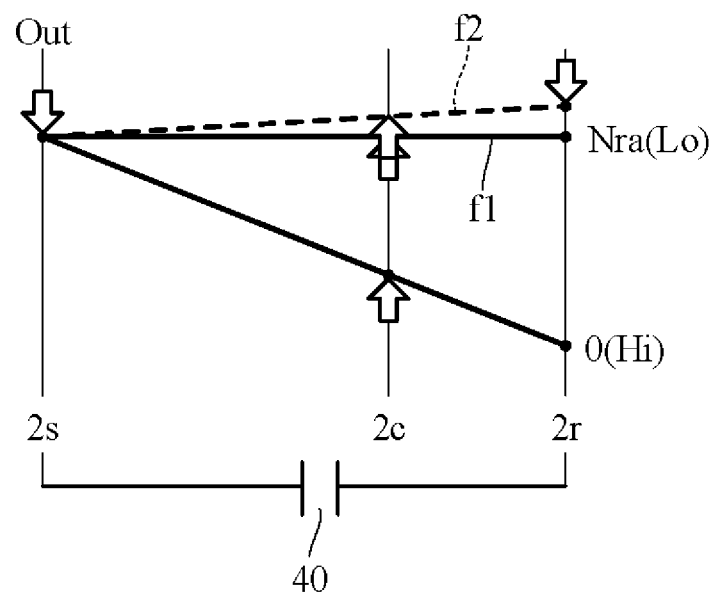
FIG. 10 is a diagram showing an example of an alignment chart of a second planetary gear mechanism when drive mode is switched from HV high mode to HV low mode.

FIG. 9 is a diagram showing change of rotational speed of the second ring gear 22 (ring gear rotational speed Nr) when drive mode is switched from HV high mode to HV low mode, and FIG. 10 is a diagram showing an example of an alignment chart (speed diagram) of the second planetary gear mechanism 20 at that time. In FIG. 10, solid line characteristic curve f1 represents target value characteristics during HV low mode and dotted line characteristic curve f2 represents measured value characteristics. As shown in FIGS. 9 and 10, ring gear rotational speed Nr at initial time point (HV high mode) is 0. Ring gear rotational speed Nr rises gradually owing to gradual disengagement of the brake mechanism 30 over time. When ring gear rotational speed Nr reaches target rotational speed Nra, the clutch mechanism 40 engages and drive mode switches to HV low mode.

In order to prevent occurrence of pull back of torque owing to clutch engagement at this time, the preceding stage clutch (brake mechanism 30) is controlled to partially clutched condition (half-clutch state) in order to engage the clutch mechanism 40 after ring gear rotational speed Nr reaches target rotational speed Nra. Therefore, as shown in FIG. 9, ring gear rotational speed Nr once rises above target rotational speed Nra (characteristic curve f2 of FIG. 10) and thereafter assumes target rotational speed Nra (characteristic curve f1 of FIG. 10). At this time, the clutch mechanism 40 engages at time point where ring gear rotational speed Nr rises above target rotational speed Nra. In this case, torque acting on the axles 57 includes not only engine torque but also additional torque attributable to inertia of the engine 1 and other potential energies. Since this momentarily increases driving force acting on the axles 57, passengers experience an unpleasant sensation. The practice for preventing such increase in driving force is to reduce (ease) clutch engaging force or to lower engine driving force at the moment of engaging the clutch mechanism 40. Such conventional clutch engaging force control is termed "normal control" at time of switching drive mode from HV high mode to HV low mode.

The present embodiment includes the torque limiter 60 interposed between the speed shift mechanism 70 and the second motor-generator 3. Slipping sometimes occurs in the torque limiter 60 owing to various causes, such as effect of reaction force from the axles 57 when riding over a bump or effect of impact due to locking of the one-way clutch 50 at time of switching from EV mode to HV mode. From this it follows that in the case of ring gear rotational speed Nr rising above target rotational speed Nra at switching from HV high mode to HV low mode, such Nr>Nra phenomenon can be caused by variance-replete normal control and can also be caused by slipping of the torque limiter 60.

When the aforesaid point is not taken into account and clutch switching is performed while reducing clutch engaging force by normal control every time ring gear rotational speed Nr rises above target rotational speed Nra, the engine 1 is apt to rev up and concomitantly cause excessive rise of ring gear rotational speed Nr as indicated by a dotted line in FIG. 9. The drive system 100 according to present embodiment is configured as follows in order to prevent such problems.

Figure 11:
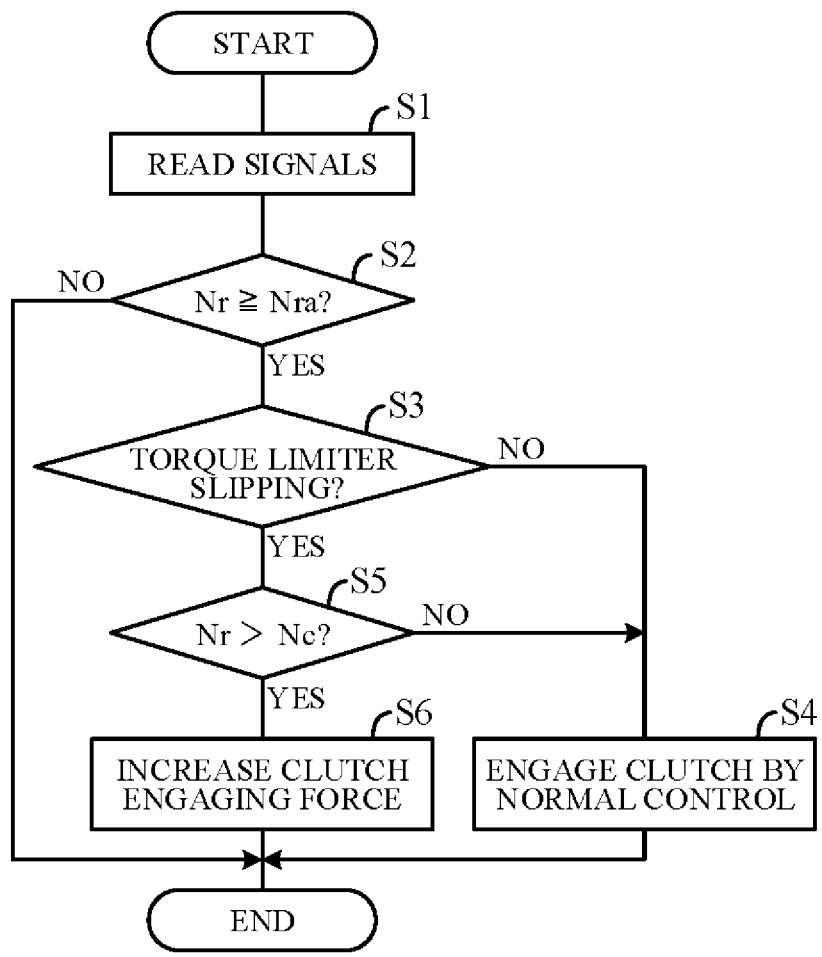
FIG. 11 is a flowchart showing an example of a processing performed by a controller of FIG. 1.

FIG. 11 is a flowchart showing an example of processing performed by the CPU of the controller 4 in accordance with a program stored in memory in advance, particularly processing performed upon switching from HV high mode to HV low mode and still more particularly processing related to engaging action of the clutch mechanism 40. The processing indicated by this flowchart is started, for example, when the mode instruction unit instructs switch to HV low mode in response to signals from the vehicle speed sensor 36 and the accelerator opening angle sensor 37 during traveling in HV high mode and is repeatedly performed periodically at predetermined intervals until switch to HV low mode is completed. During switching from HV high mode to HV low mode, engaging force of the brake mechanism 30 is gradually lowered as stated above.

First, in S1 (S: processing Step), signals are read from the rotational speed sensor 34 for detecting rotational speed of the engine 1 (engine speed Ne), the rotational speed sensor 35 for detecting ring gear rotational speed Nr, the rotational speed sensor 38 for detecting rotational speed of the first motor-generator 2 (first motor-generator rotational speed Nm1), and the rotational speed sensor 39 for detecting rotational speed of the second motor-generator 3 (second motor-generator rotational speed Nm2).

Next, in S2, whether ring gear rotational speed Nr detected by the rotational speed sensor 35 reached target rotational speed Nra is determined. For example, target rotational speed Nra corresponds to second motor-generator rotational speed Nm2 detected by the rotational speed sensor 39. If a positive decision is made S2, the routine proceeds to S3, and if a negative decision is made, processing is terminated.

In S3, whether slipping is occurring in the torque limiter 60 is determined based on signals from the rotational speed sensors 34, 35, 38 and 39. Specifically, rotational speed of the second carrier 24 (carrier rotational speed Nc) is first calculated based on engine speed Ne and first motor-generator rotational speed Nm1. Next, rotational speed of the second sun gear 21, assuming no slipping of the torque limiter 60 (sun gear rotational speed Ns), is calculated by Eq. (1) below, using carrier rotational speed Nc, ring gear rotational speed Nr, gear tooth ratio λ of numbers of teeth of the second sun gear 21 and the second ring gear 22 (=number of second sun gear teeth/number of second ring gear teeth):

$$Ns=(Nc-Nr)/\lambda+Nc \qquad \text{Eq. (1)}$$

Next, whether difference ΔN obtained by subtracting second motor-generator rotational speed Nm2 from calculated sun gear rotational speed Ns (=Ns−Nm2) is greater than a prescribed predetermined value ΔN1 is determined. This determination is for detecting occurrence of slipping of the torque limiter 60, and predetermined value ΔN1 is set to a value not less than 0 (e.g., 0). In addition, change rate a of difference ΔN over time (=ΔN/dt) is calculated and whether change rate a is greater than a prescribed predetermined value a1 is determined. This determination is also for detecting occurrence of slipping of the torque limiter 60, and predetermined value α1 is, for example, set to a value greater than 0. And when ΔN>ΔN1 and α>α1, slipping is determined to be occurring in the torque limiter 60. If a positive decision is made in S3, the routine proceeds to S5, and if a negative decision is made, the routine proceeds to S4.

In S4, a control signal is output to the control valve 8a to engage the clutch mechanism 40 while the brake mechanism 30 is controlled to half-clutch state as stated above. At this time, clutch engaging force of the clutch mechanism 40 is reduced at the moment of engagement. In other words, the clutch mechanism 40 is engaged by the normal control.

Figure 12A:
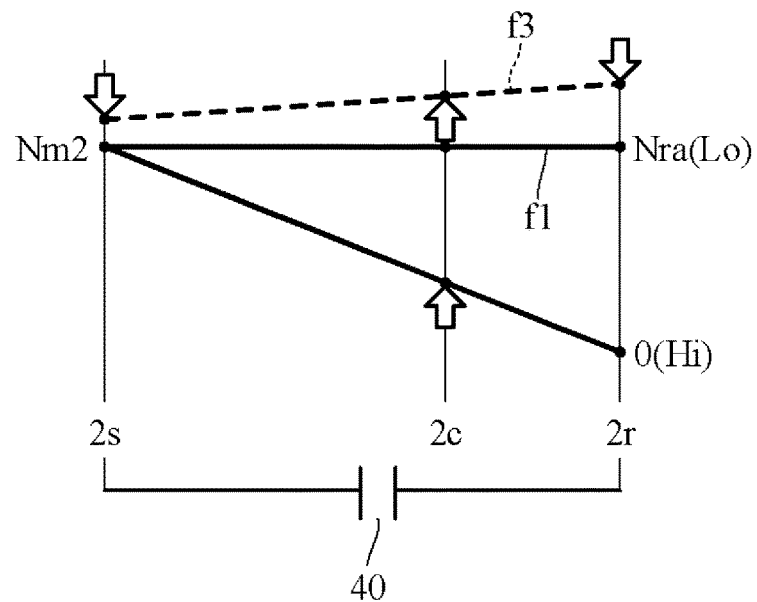
FIG. 12A is a diagrams showing an example of an alignment chart of the second planetary gear mechanism when slip has occurred in the torque limiter.
Figure 12B:
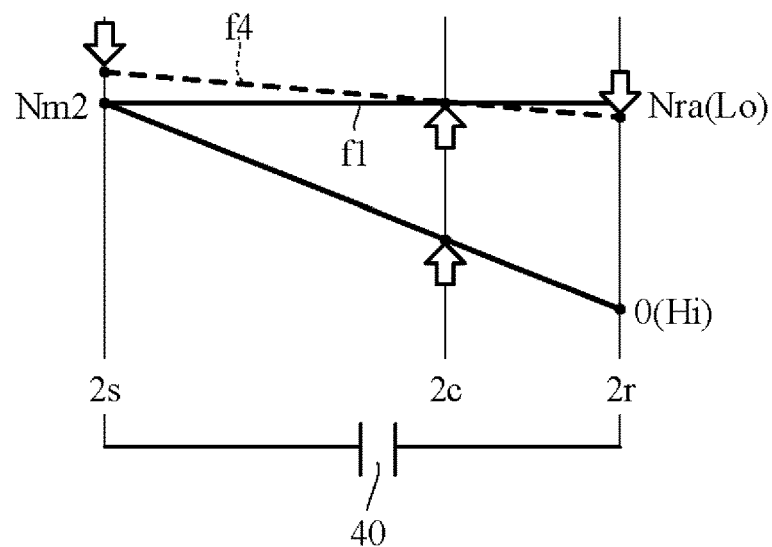
FIG. 12B is a diagrams showing another example of an alignment chart of the second planetary gear mechanism when slip has occurred in the torque limiter.

In S5, on the other hand, whether ring gear rotational speed Nr is greater than carrier rotational speed Nc is determined. FIGS. 12A and 12B are diagrams showing examples of alignment charts of the second planetary gear mechanism 20 when slip has occurred in the torque limiter 60, i.e., when Ns>Nm2. FIG. 12A shows characteristic curve f3 in case of Nr>Nc, and FIG. 12B shows characteristic curve f4 in case of Nr<Nc. Characteristic curves f3 and f4 represent measured value characteristics, and characteristic curve f1 represents target value characteristics. If a positive decision is made in S5 (state in FIG. 12A), the routine proceeds to S6, and if a negative decision is made, the routine proceeds to S4.

In S6, a signal is output to the control valve 8a to increase engaging force of the clutch mechanism 40 to above that by the normal control. For example, where engaging force under the normal control of S4 is first engaging force, engaging force in S6 is increased to second engaging force larger than first engaging force (see FIG. 13). Since the succeeding stage clutch therefore firmly grabs, rev-up of the engine 1 can be prevented. The point here is that in the case of Nr>Nc, load on the engine 1 is small when the clutch mechanism 40 is engaged under the normal control and the engine 1 is therefore apt to rev up. However, rev-up of the engine 1 can be prevented by increasing clutch engaging force (clutch fastening force). As a result, increase in ring gear rotational speed Nr can be minimized.

When clutch engaging force is increased, driving force momentarily increases owing to addition of torque due to inertia of the engine 1 and other potential energies. However, since slipping arises in the torque limiter 60, this increase in driving force is absorbed by increasing amount of slipping of the torque limiter 60. Increase of driving force to the axles 57 can therefore be minimized. Since difference ΔN between sun gear rotational speed Ns and second motor-generator rotational speed Nm2 decreases rapidly with increasing clutch engaging force, slipping of the torque limiter 60 can be promptly eliminated. When slipping of the torque limiter 60 is eliminated at time difference ΔN falls to or below predetermined value ΔN1, increase of clutch engaging force is discontinued to transition control to the normal control (S4).

Although not indicated in the drawings, when the controller 4 switches from HV high mode to HV low mode, it outputs a control signal to the power control unit 5 to reduce driving force of the second motor-generator 3 irrespective of whether the torque limiter 60 is slipping. For example, driving force of the second motor-generator 3 is reduced when ring gear rotational speed Nr reaches target rotational speed Nra or when ring gear rotational speed Nr rises above carrier rotational speed Nc. This ensures smooth traveling behavior of the vehicle. The point here is that at time of switching to HV low mode, driving force to the axles 57 is apt to increase owing to the effect of engine 1 inertia and the like because the clutch mechanism 40 is engaged after ring gear rotational speed Nr rises above target rotational speed Nra. Stable traveling behavior is therefore achieved by reducing driving force of the second motor-generator 3 and thereby restricting momentary increase of driving force to the axles 57. Amount of reduction of driving force from the second motor-generator 3 in this case is decided based on rotation change of associated elements obtained from the rotational speed sensors 34, 35, 38 and 39.

Figure 13:
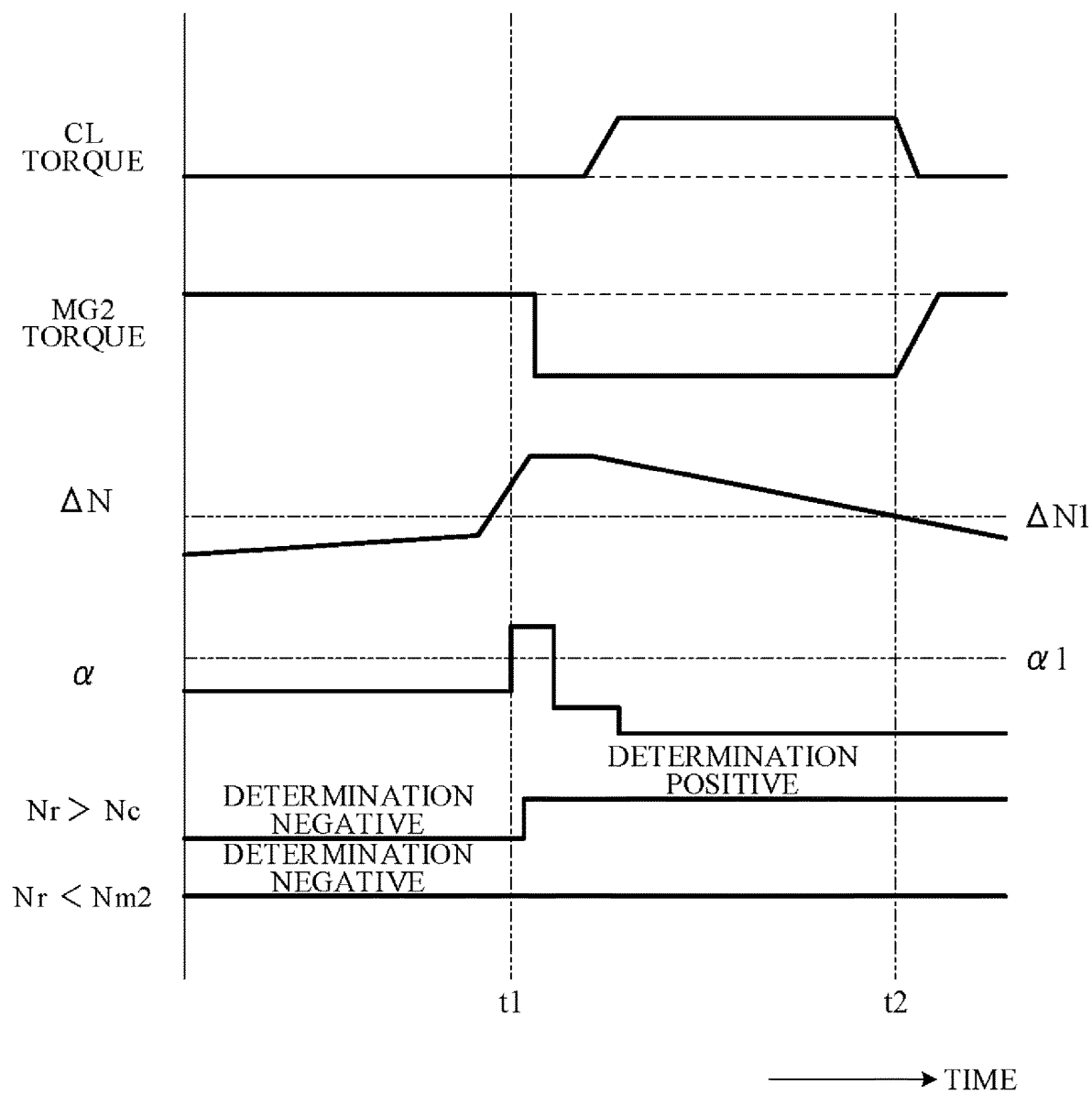
FIG. 13 is a time chart showing an example of an operation of the drive system of the hybrid vehicle according to the present embodiment.

FIG. 13 is a time chart showing time-course changes, during drive mode switching from HV high mode to HV low mode, of clutch torque (CL torque) corresponding to engaging force of the clutch mechanism 40, torque (MG2 torque) of the second motor-generator 3, difference ΔN between sun gear rotational speed Ns and second motor-generator rotational speed Nm2, change rate a of difference ΔN over time (=ΔN/dt), result of determining whether ring gear rotational speed Nr is greater than carrier rotational speed Nc, and result of determining whether ring gear rotational speed Nr is less than second motor-generator rotational speed Nm2.

As shown in FIG. 13, in state of ring gear rotational speed Nr of not less than second motor-generator rotational speed Nm2 (state when Nr<Nm2 determination negative), when, at time t1, difference ΔN exceeds predetermined value ΔN1 and change rate a exceeds predetermined value α1, occurrence of slipping of the torque limiter 60 is determined (S3). When ring gear rotational speed Nr thereafter rises above carrier rotational speed Nc (state when Nr>Nc determination positive), CL torque increases (S6). Rev-up of the engine 1 can therefore be prevented. Since MG2 torque is in lowered state at this time, increase of driving force to the axles 57 can be held down.

Difference ΔN gradually decreases with increasing CL torque. When difference ΔN falls to or below predetermined value ΔN1 at time t2, CL torque returns to state before increase. Switching to HV low mode is thereafter performed by the normal control. In other words, the normal control is implemented after slipping of the torque limiter 60 is eliminated. At time t2 in FIG. 13, MG2 torque gradually rises and returns to original value after restoration of CL torque. So at the time the torque limiter 60 is restored from its operating state (slipping state), passengers are saved from feeling an unusual shift sensation that they would otherwise experience owing to additional driving force acting on the axles 57.

The present embodiment can achieve advantages and effects such as the following:

(1) The drive system 100 of the hybrid vehicle includes: the internal combustion engine 1; the engageable and disengageable brake mechanism 30 installed in the power transmission paths 71, 72 for transmitting motive power of the engine to the axles 57; the speed shift mechanism 70 including the engageable and disengageable clutch mechanism 40 and adapted to switch to HV low mode or HV high mode in response to engaging actions of the brake mechanism 30 and the clutch mechanism 40 in accordance with shift instruction; the second motor-generator 3 connected between the speed shift mechanism 70 and the axles 57 within the power transmission paths 71, 72; the torque limiter 60 interposed between the second motor-generator 3 and the speed shift mechanism 70 within the power transmission paths 71, 72; and the controller 4 for, at time of switching from HV high mode to HV low mode, controlling the speed shift mechanism 70 to disengage the engaged-state brake mechanism 30 and engage the disengaged-state clutch mechanism 40 (FIG. 1). The drive system 100 further includes the rotational speed sensors 34, 35, 38 and 39 (FIG. 1). When occurrence of slipping of the torque limiter 60 is detected based on signals from the rotational speed sensors 34, 35, 38 and 39, the controller 4 controls the speed shift mechanism 70 to make engaging force of the clutch mechanism 40 at time of switching from HV high mode to HV low mode greater than when occurrence of slipping is not detected (under the normal control) (FIG. 11).

This enables the speed shift mechanism 70 to perform proper switching because it prevents rev-up of the engine 1 and concomitant overspeed rotation of the second ring gear 22 that are apt to occur when slipping arises in the torque limiter 60 at time of switching from HV high mode to HV low mode.

(2) The speed shift mechanism 70 includes the second planetary gear mechanism 20 having the second sun gear 21 connected to the output shaft 27 of the speed shift mechanism 70, the second carrier 24 input with motive power from the engine 1, and the second ring gear 22 (FIG. 1). The brake mechanism 30 is adapted to brake and non-brake rotation of the second ring gear 22, and the clutch mechanism 40 is adapted to integrally join (connect) or to separate (disconnect) the second sun gear 21 and second ring gear 22 (FIG. 1). The drive system 100 includes the rotational speed sensor 35 for detecting rotational speed Nr of the second ring gear 22, and the rotational speed sensors 34 and 38 for detecting rotational speed Nc of the second carrier 24 (FIG. 1). When occurrence of slipping of the torque limiter 60 is detected based on signals from the rotational speed sensors 34, 35, 38 and 39 at time of switching from HV high mode to HV low mode, the controller 4 is responsive to ring gear rotational speed Nr detected by the rotational speed sensor 35 being greater than carrier rotational speed Nc detected by the rotational speed sensors 34 and 38 for controlling the speed shift mechanism 70 to make engaging force of the clutch mechanism 40 greater when ring gear rotational speed Nr increases to beyond target rotational speed Nra than when ring gear rotational speed Nr is not greater than carrier rotational speed Nc (under the normal control). Since this results in clutch engaging force being increased when degree of rev-up of the engine 1 is great at Nr>Nc, rev-up of the engine 1 can be effectively prevented when slipping occurs in the torque limiter 60.

(3) When rotational speed difference ΔN obtained by subtracting rotational speed Nm2 of the second motor-generator 3 from rotational speed Ns of the second sun gear 21 is greater than predetermined value ΔN1 and change rate a of difference ΔN (=ΔN/dt) is greater than predetermined value α1, the controller 4 determines that slipping is occurring in the torque limiter 60. Occurrence of slipping of the torque limiter 60 can therefore be accurately detected.

(4) The drive system 100 further includes the first planetary gear mechanism 10 serving as a power division mechanism installed in the power transmission path 71 between the engine 1 and the speed shift mechanism 70, and the first motor-generator 2 input with divided power via the first planetary gear mechanism 10 (FIG. 1). Since the drive system 100 is thus configured as a two-motor system, driving force required by the vehicle can be easily ensured while maintaining adequate SOC of the battery 6.

Various modifications of the aforesaid embodiment are possible. Some examples are explained in the following. In the aforesaid embodiment, the controller 4 is adapted to detect that slipping is occurring in the torque limiter 60 when difference ΔN obtained by subtracting rotational speed Nm2 of the second motor-generator from rotational speed Ns of the sun gear is greater than predetermined value ΔN1 (first predetermined value) and change rate a of difference ΔN is greater than predetermined value α1 (second predetermined value), but the slipping detection unit is not limited to this configuration. Alternatively, occurrence of slipping of the torque limiter 60 can be detected solely on condition of difference ΔN being greater than predetermined value ΔN1. Optionally, occurrence of slipping of the torque limiter 60 can be directly detected using a separate sensor, i.e., without using signals from the rotational speed sensors 34, 35, 38 and 39.

In the aforesaid embodiment, the controller 4 serving as control unit is adapted to control the speed shift mechanism 70 at time of switching from high-speed stage to low-gear stage, i.e., at time of switching from HV high mode to HV low mode, so as to disengage the engaged-state brake mechanism and engage the disengaged-state clutch mechanism. Namely, although the brake mechanism 30 is provided as a first frictional engagement mechanism and the clutch mechanism 40 as a second frictional engagement mechanism, the first frictional engagement and the second frictional engagement are not limited to this configuration. Therefore, the configuration of a speed shift mechanism is therefore not limited to the aforesaid configuration. Although in the aforesaid embodiment, rotational speed Nr of the second ring gear 22 is detected by the rotational speed sensor 35, a ring gear speed detector is not limited to this configuration. Although in the aforesaid embodiment, rotational speed Nc of the second carrier 24 is detected using signals from the rotational speed sensors 34 and 38, a carrier speed detector is not limited to this configuration.

The above embodiment can be combined as desired with one or more of the above modifications. The modifications can also be combined with one another.

According to the present invention, even if slipping occurs in a torque limiter interposed between a motor-generator and a speed shift mechanism, it is possible to favorably switch the speed shift mechanism.

Above, while the present invention has been described with reference to the preferred embodiments thereof, it will be understood, by those skilled in the art, that various changes and modifications may be made thereto without departing from the scope of the appended claims.

What is claimed is:

1. A drive system of a hybrid vehicle, comprising:
   an internal combustion engine;
   a power transmission path formed from the internal combustion engine to an axle;
   a speed shift mechanism disposed in the power transmission path and including a first frictional engagement mechanism having mutually engageable and disengageable members and a second frictional engagement mechanism having mutually engageable and disengageable members so as to switch a speed stage to a low speed stage or a high speed stage in accordance with a speed shift instruction;
   a motor-generator disposed in the power transmission path between the speed shift mechanism and the axle;
   a torque limiter disposed in the power transmission path between the speed shift mechanism and the motor-generator to limit a transmitted torque by slipping; and
   an electronic control unit including a microprocessor and a memory,
   the microprocessor is configured to perform
   controlling the speed shift mechanism so as to disengage the first frictional engagement mechanism in an engaged state and engage the second frictional engagement mechanism in a disengaged state during switching from the high speed stage to the low speed stage,
   detecting an occurrence of slipping of the torque limiter, and
   the controlling including controlling the speed shift mechanism so as to increase an engaging force of the second frictional engagement mechanism during switching from the high speed stage to the low speed stage when the occurrence of slipping is detected than when the occurrence of slipping is not detected.

2. The drive system according to claim 1, wherein
   the speed shift mechanism includes a planetary gear mechanism having a sun gear connected to an output shaft of the speed shift mechanism, a carrier to which a power from the internal combustion engine is input, and a ring gear,
   the first frictional engagement mechanism is a brake mechanism configured to brake or non-brake the ring gear by engaging or disengaging,
   the second frictional engagement mechanism is a clutch mechanism configured to integrally join or separate the sun gear and the ring gear by engaging or disengaging,
   the drive system further comprises:
      a ring gear speed detector configured to detect a rotational speed of the ring gear; and
      a carrier speed detector configured to detect a rotational speed of the carrier,
   the microprocessor is configured to perform
   the controlling including controlling the speed shift mechanism so that when the occurrence of slipping is detected during switching from the high speed stage to the low speed stage and the rotational speed detected by the ring gear speed detector is greater than a target rotational speed, the engaging force of the second frictional engagement mechanism is a target engaging force, and
   the target engaging force when the rotational speed detected by the ring gear speed detector is greater than the rotational speed detected by the carrier speed detector is greater than the target engaging force when the rotational speed detected by the ring gear speed detector is smaller than or equal to the rotational speed detected by the carrier speed detector.

3. The drive system according to claim 1, further comprising:
   a sun gear speed detector configured to detect a rotational speed of the sun gear; and
   a motor speed detector configured to detect a rotational speed of the motor-generator, wherein
   the microprocessor is configured to perform
   the detecting including detecting the occurrence of slipping when a rotational speed difference calculated by subtracting the rotational speed detected by the motor speed detector from the rotational speed detected by the sun gear speed detector is greater than a predetermined rotational speed difference.

4. The drive system according to claim 3, wherein
   the microprocessor is configured to perform
   the detecting including detecting the occurrence of slipping when the rotational speed difference is greater than the predetermined rotational speed difference and a change rate of the rotational speed difference is greater than a predetermined change rate.

5. The drive system according to claim 1, wherein
   the motor-generator is a second motor-generator, and
   the drive system further comprises:
      a power division mechanism disposed in the power transmission path between the internal combustion engine and the speed shift mechanism to divide a power generated by the internal combustion engine; and
      a first motor-generator to which a power divided by the power division mechanism is input.

6. The drive system according to claim 1, wherein
   the microprocessor is configured to perform
   the controlling including controlling the speed shift mechanism so as to control the engaging force of the second frictional engagement mechanism to a first engaging force during switching from the high speed stage to the low speed stage when the occurrence of slipping is not detected, while so as to control the engaging force of the second frictional engagement mechanism to a second engaging force greater than the first engaging force during switching from the high speed stage to the low speed stage when the occurrence of slipping is detected, and then so as to control the engaging force of the second frictional engagement mechanism to the first engaging force after the occurrence of slipping is not detected.

7. The drive system according to claim 1, wherein
   the microprocessor is configured to further perform
   controlling the motor-generator so as to decrease a driving force of the motor-generator when the occurrence of slip is detected during switching from the high speed stage to the low speed stage.

8. A drive method of a hybrid vehicle, the hybrid vehicle including: an internal combustion engine; a speed shift mechanism disposed in a power transmission path formed from the internal combustion engine to an axle and including a first frictional engagement mechanism having mutually engageable and disengageable members and a second frictional engagement mechanism having mutually engageable and disengageable members so as to switch a speed stage to a low speed stage or a high speed stage in accordance with a speed shift instruction; a motor-generator disposed in the power transmission path between the speed shift mechanism and the axle; and a torque limiter disposed in the power transmission path between the speed shift mechanism and the motor-generator to limit a transmitted torque by slipping, the drive method comprising:

detecting an occurrence of slipping of the torque limiter; and controlling the speed shift mechanism so as to disengage the first frictional engagement mechanism in an engaged state and engage the second frictional engagement mechanism in an disengaged state during switching from the high speed stage to the low speed stage, wherein the controlling includes controlling the speed shift mechanism so as to increase an engaging force of the second frictional engagement mechanism during switching from the high speed stage to the low speed stage when the occurrence of slipping is detected than when the occurrence of slipping is not detected.

\* \* \* \* \*